United States Patent
Dahlin et al.

(10) Patent No.: US 6,282,572 B1
(45) Date of Patent: *Aug. 28, 2001

(54) PROVIDING A MASTER DEVICE WITH SLAVE DEVICE CAPABILITY INFORMATION

(75) Inventors: Mats Håkan Dahlin, Guilford (GB); Mats Erland Eriksson, Boden; Lennart Adolf Nils Löfgren, Vikingstad, both of (SE)

(73) Assignee: Telefonaktieboalget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/237,988

(22) Filed: May 4, 1994

(51) Int. Cl.$^7$ .................................................. G06F 13/22

(52) U.S. Cl. ................................ 709/228; 710/10; 710/19

(58) Field of Search .................................. 395/200, 600, 395/325, 200.05, 200.1, 284

(56) References Cited

U.S. PATENT DOCUMENTS

| | | | |
|---|---|---|---|
| 4,075,691 | 2/1978 | Davis et al. | 395/275 |
| 4,335,426 | 6/1982 | Maxwell et al. | 395/725 |
| 4,418,382 | 11/1983 | Larson et al. | 395/200 |
| 4,459,655 | 7/1984 | Willemin | 364/132 |
| 4,788,637 | 11/1988 | Tamaru | 395/200 |
| 4,887,266 | 12/1989 | Neve et al. | 370/95.1 |
| 4,941,175 | * 7/1990 | Enescu et al. | 380/4 |
| 4,975,830 | 12/1990 | Gerpheide et al. | 395/200 |

(List continued on next page.)

FOREIGN PATENT DOCUMENTS

| | | |
|---|---|---|
| 0 380857 A2 | 8/1990 | (EP) . |
| 3148749 | 6/1991 | (JP) . |
| 4-157854 | 5/1992 | (JP) . |

OTHER PUBLICATIONS

Rosenberg, Dictionaty of Computers, Information Processing & Telecommunications, 1987 p. 189.*
Operating System Concepts, James L. Peterson Et Al, 1985 pp. 412–413.*
Introduction To Algorithms, Cormen Et Al., 1989 pp 77–83.*

Primary Examiner—Paul R. Myers
(74) Attorney, Agent, or Firm—Burns, Doane, Swecker & Mathis, L.L.P.

(57) ABSTRACT

In a system having a master device coupled to a slave device by means of an interface, wherein a function of the master device includes downloading a control program to the slave device, an apparatus for providing the master device with capability information corresponding to the slave device has hardware for reading the capability information from a predefined portion of the control program, and hardware for storing the capability information for use by the master device during a communications operation with the slave device. An encoding scheme for the capability information permits new functions to be added without having to re-encode pre-existing information corresponding to pre-existing slave devices. The capability information is encoded as a first vector and a second vector. A new function that is supported by a new slave device is added to the first vector when the new function is not supported by any pre-existing slave device. Default values are provided for pre-existing first vectors, to indicate that the new function is not supported by the pre-existing slave devices. Similarly, a new function that is supported by all pre-existing slave devices but not supported by a new slave device is added to the second vector, with appropriate default values provided for pre-existing second vectors.

7 Claims, 4 Drawing Sheets

U.S. PATENT DOCUMENTS

| | | | |
|---|---|---|---|
| 5,001,740 | 3/1991 | Takano et al. | 379/1 |
| 5,022,028 | 6/1991 | Edmonds et al. | 371/25.1 |
| 5,093,782 * | 3/1992 | Muraski et al. | 395/600 |
| 5,109,484 | 4/1992 | Hughes et al. | 395/200 |
| 5,155,847 | 10/1992 | Kirouac et al. | 395/600 |
| 5,303,367 * | 4/1994 | Leenstra, Sr. et al. | 395/600 |
| 5,317,693 * | 5/1994 | Cuenod et al. | 710/9 |
| 5,335,346 * | 8/1994 | Fabbio | 395/600 |
| 5,349,673 | 9/1994 | Yasuda . | |
| 5,386,512 | 1/1995 | Crisman et al. . | |
| 5,390,301 * | 2/1995 | Scherf | 709/300 |
| 5,414,812 * | 5/1995 | Filip et al. | 395/200 |

* cited by examiner

PROVIDING A MASTER DEVICE WITH SLAVE DEVICE CAPABILITY INFORMATION

BACKGROUND

The present invention relates to protocol negotiation between peer entities in a system, and more particularly to providing a master node with information about which functions are supported by a slave node in a communication system.

Systems are well known in which peer entities communicate with one another. In particular, such systems often include a device designated as a master node which communicates with a number of subordinate devices designated as slave nodes. Because individual slave devices may differ from one another, the master node must have knowledge regarding which functions (also referred to in this specification as "capabilities") are supported by each slave device in order to be able to communicate with that device. For example, in a cellular mobile telephone system different channel types provided by a cellular transceiver may require communicating at correspondingly different data rates because of the use of different communication protocols. One such system having this configuration is the link between the switching center and the base station in the European radiotelephone cellular communications system standard known as the Global System for Mobile Communications (GSM). Capabilities that a base station may or may not support in this system include: half-rate speech channels, combined signaling and control channel, data communication facilities, and different versions of the communication protocol towards the base station.

Frequently in such systems, new slave devices will either be added, or will replace existing slave devices. When this happens, the master node must obtain information telling it which functions are supported by the new slave device in order to communicate with it.

For example, in a mobile telephone network having a base station controller (BSC) which manages the operations of many base stations (BS) spread out over a large geographic area, the BSC must know which set of functions are supported by which base station. However, the supported functions may change from time to time for a number of reasons. First, new base stations may be added to the network, thus presenting an additional set of functions that the BSC must know about. Furthermore, base stations are usually controlled by software which evolves over time. As new software is released, it may allow a base station to perform previously unsupported functions. Because the software and hardware may differ from one base station to the next, a way must be provided for the BSC to obtain information about which functions are supported at which nodes.

A prior solution to this problem utilizes a predefined negotiation procedure between the master and slave devices. During this negotiation procedure, the master and slave devices utilize a predefined protocol to exchange information about which functions will be supported on the interface connecting the two. An example of this solution may be found in facsimile ("fax") machines which, prior to transmission, negotiate over which data rate to use. This solution, however, is cumbersome in that it requires undesirable overhead communications on the interface linking the master and slave devices. Furthermore, because the negotiation protocol must be defined, changes and future adaptations of capabilities are not possible without corresponding changes of possibly major proportions to the protocols being used by existing slaves. Therefore, a simpler and more flexible solution is desired.

SUMMARY

It is therefore an object of the present invention to provide a mechanism for providing a master node device with information regarding which functions are supported by a slave device (capability information), without requiring the master and slave devices to perform a negotiation procedure to communicate this information.

It is another object of the present invention to provide an encoding scheme for the capability information which permits a slave device to be added without changing the capability information already encoded for pre-existing slave devices, even if the added slave device supports a new function that is not supported by any pre-existing slave devices.

It is yet another object of the present invention to provide an encoding scheme for the capability information which permits a slave device to be added without changing the capability information already encoded for pre-existing slave devices, even if the added slave device does not support a function that is supported by all pre-existing slave devices.

In accordance with one aspect of the present invention, the foregoing and other objects are achieved by an apparatus in a system having a master device coupled to a slave device by means of an interface, wherein a function of the master device includes downloading a control program to the slave device. The apparatus provides the master device with capability information corresponding to the slave device. The apparatus comprises means for reading the capability information from a predefined portion of the control program, and means for storing the capability information for use by the master device during a communications operation with the slave device. By locating the capability information in a predefined portion of the control program, the master device is provided with new capability information whenever the control program is upgraded. Also, because the capability information is always stored in the master device, the need for a predefined negotiation procedure between the master and slave device is eliminated.

In accordance with another aspect of the present invention, an encoding scheme is provided for the capability information, whereby new slave devices can be added to the system without requiring pre-existing capability information to be re-encoded to accommodate newly defined functions. The capability information for each slave device comprises a first vector and a second vector. Each of the first and second vectors has a number of variables, each indicating whether a corresponding function is supported by the corresponding slave device. When a new slave device is added to the system, there may be a need to redefine one or both of the second vectors to add variables corresponding to new functions not previously defined within the system. However, pre-existing capability information will not have to be modified to include these new variables. Consequently, the capability information for any particular slave device may be missing one or more variables which are defined within the system. To compensate for this, the means for reading comprises first default means, responsive to the number of variables of the first vector being less than a number of defined first vector variables, for supplying first default values for variables that are missing in the first vector. The first default values are selected to indicate that corresponding functions are not supported by the corresponding slave device. The means for reading further comprises second default means, responsive to the number of variables of the second vector being less than a number of defined second vector variables, for supplying second default values for variables that are missing in the second vector. The second default values are selected to indicate that corresponding functions are supported by the corresponding slave device.

In accordance with this aspect of the invention, it is possible for the capability information to consist of two vectors, one or both of which have no variables whatsoever. Having no variables in both of the vectors corresponds to the situation where each slave device in the system supports each and every function that is supported by any other slave device in the system. In this case, the information about the supported capabilities of each slave device are provided entirely by the first and second default means.

In yet another aspect of the present invention, a method is disclosed for adding a new slave device to a system having a master device coupled to a plurality of pre-existing slave devices, each slave device having corresponding capability information stored in the master device. First, a new first vector having a length equal to a predefined first vector is stored in the master device. Each variable in the new first vector is set in correspondence with the new slave device alternatively supporting or not supporting a corresponding function defined in the predefined first vector. Next, a new second vector having a length equal to a predefined second vector is stored in the master device. Each variable in the new second vector is set in correspondence with the new slave device alternatively supporting or not supporting a corresponding function defined in the predefined second vector.

Then, an additional storage location to be associated with the new first vector is allocated in the master device. Into this additional storage location is stored a first additional variable in correspondence with a first new function that is supported by the new slave device but not supported by any pre-existing slave device. The first additional variable is set to indicate that the slave device supports the first new function. When this technique is used in conjunction with the first default means described above, it is unnecessary to modify any pre-existing capability information, since these missing values will default to a value indicating that pre-existing slave devices do not support the function.

Next, an additional storage location to be associated with the new second vector is allocated in the master device. Into this additional storage location is stored a second additional variable in correspondence with a second new function that is supported by every pre-existing slave device but not supported by the new slave device. The second additional variable is set to indicate that the slave device does not support the second new function. When this technique is used in conjunction with the second default means described above, it is again unnecessary to modify any pre-existing capability information, since these missing values will default to a value indicating that pre-existing slave devices support the newly added function.

Finally the first and second predefined vectors are redefined to include respective storage locations corresponding to the first and second additional variables.

BRIEF DESCRIPTION OF THE DRAWINGS

The objects and advantages of the invention will be understood by reading the following detailed description in conjunction with the drawings in which.

DETAILED DESCRIPTION

Figure 1:
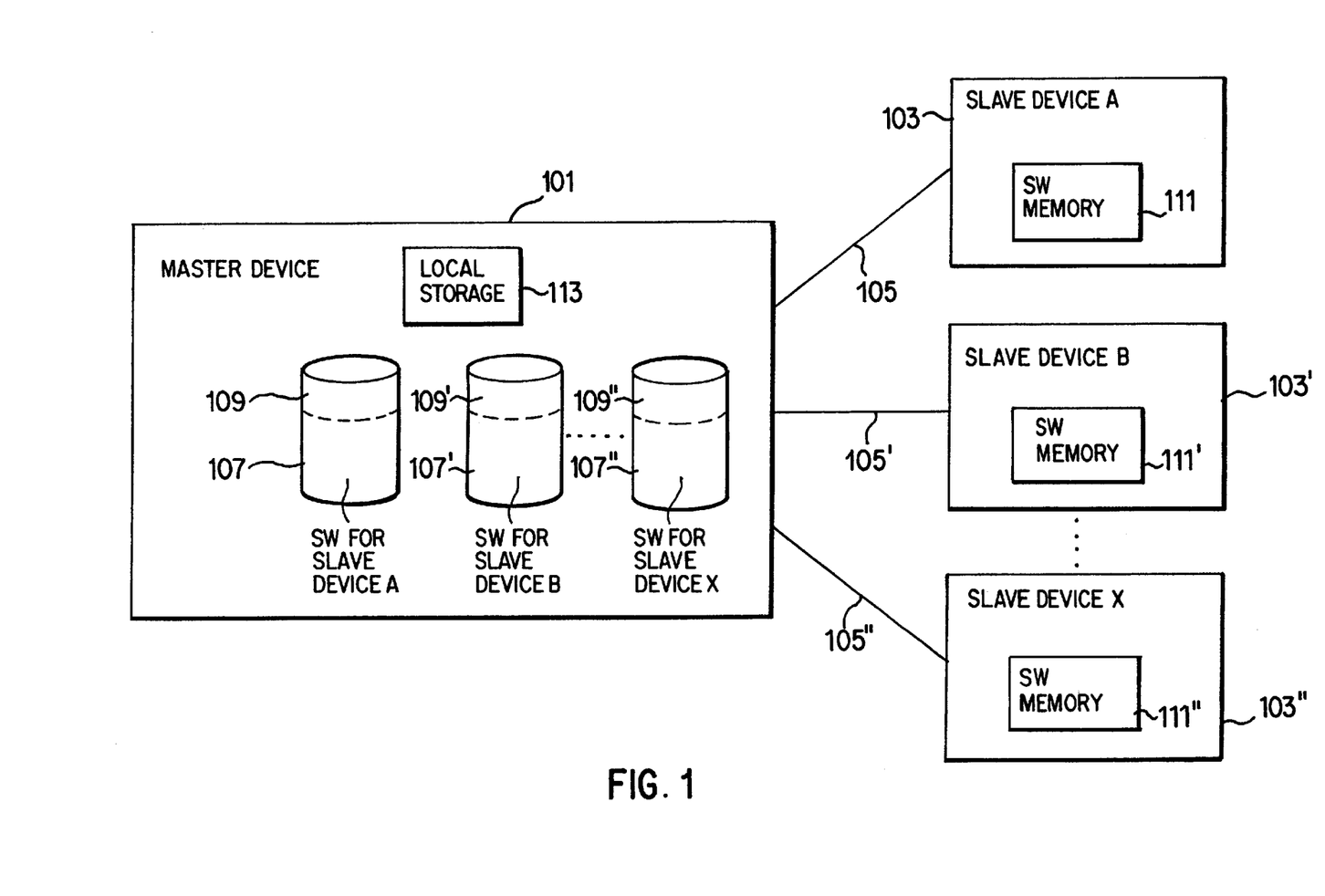
FIG. 1 is a block diagram of a system which includes a master device coupled to slave devices by means of respective interfaces.

Referring to FIG. 1, a block diagram of a system is shown which includes a master device 101 coupled to slave devices 103, 103', 103" by means of respective interfaces 105, 105', 105". The master device 101 may be, for example, a BSC, and the slave devices 103, 103', 103" may be a number of base stations connected in a mobile telephone network. The master device 101 includes control software 107, 107', 107" for each of the slave devices 103, 103', 103" which is to be downloaded to the slave devices, by means of interfaces 105', 105", 105''', upon the startup of the system, and whenever else such downloading is required, such as after a power failure that occurs at one or more base station sites in a cellular mobile telephone system. As the operations to be described here are applicable to each of the slave devices 103, 103', 103", the following description will focus on how the master device 101 learns the capability of the slave device 103. It will be apparent to those skilled in the art, however, that the technique described with respect to slave device 103 may be applied to any of the remaining slave devices 103', 103".

The control software 107, when loaded in the software memory 111, controls the normal operations of the slave device 103. In a system such as the one described, when a slave device is replaced by a new device, the master device 101 may be provided with corresponding updated control software 107 for the new device. Systems in which master nodes download control software to slave devices during initial program load (IPL) of the slave devices are well known in the art, and are not described here further.

In accordance with the present invention, the control software 107 is inseparably associated with a portion that contains capability information 109 regarding the functions supported by the corresponding slave device 103. For example, the start of the capability information 109 may be located at a known position within the control software 107 so that the master device 101 is able to locate it, and distinguish it from the rest of the control software 107. In a preferred embodiment of the invention, the capability information 109 is readily identifiable because the control software 107 for the slave device 103 is divided into files which are retained in a data base at the master device 101. In this embodiment, it is important that this set of files be treated as a single package within the master device 101. One or more of these files contains only data representing the capability information 109. It is not essential that the capability information 109 be downloaded to the slave device 103, since it is intended to convey information primarily to the master device 101. However, if the capability information 109 is downloaded to the slave device 103, then a system fault determination may be made, as will be described in further detail below.

Further in accordance with the present invention, prior to downloading the control software 107 to the slave device 103, the master device 101 reads the capability information 109 and stores it in its local storage 113. The information stored in the local storage 113 is later used by the master device 101 to determine which functions are supported by the slave device 103 on the interface 105. This capability information 109 may also indicate to the master device 101 which procedures must be used to load the software into the slave.

It can be seen that this mechanism provides great freedom in the ability to change (or update) the slave device 103 without having to utilize a predefined negotiation procedure to inform the master device 101 of which new functions are supported (or which old functions are no longer supported) by the slave device 103 on the interface 105. This is because every time the slave device 103 is changed in a way that affects the functions that it supports, the master device 101 will be provided with corresponding control software 107 for that device. Because the new control software 107 will always contain updated capability information 109, the master device 101 can easily determine which functions are supported by the new slave device 103.

In a preferred embodiment of the present invention, the master device 101 operates as follows:

```
FOR all slaves DO
    IF software needs to be loaded THEN
        Get vectors from software package
        Load software into slave by using the
            procedures as indicated by the
            fetched vectors (or by default
            procedures if loading is not defined
            in the vector)
        Start software in slave
    ENDIF
    FOR any invoked network function involving a
        slave DO
        IF the function is defined according to
            latest definition of vectors THEN
            IF function is supported THEN
                Invoke function in slave by
                    using the indicated
                    procedures
            ELSE
                Reject the function
            ENDIF
        ELSE
            Invoke function in slave by using
                default procedures
        ENDIF
    ENDFOR
ENDFOR
```

It will be apparent to those skilled in the art, that the capability information 109 can be formatted in any of a number of different ways. For example, one might define, at the outset, the complete set of functions that will ever be supported over an interface 105. However, this might prove to be too limiting, as unanticipated functions come into existence.

In a preferred embodiment, the capability information 109 is encoded in an upward compatible format, so that newly defined functions may be added to the encoding scheme without disturbing the encoding of capability information of slave devices that have not been upgraded. This encoding scheme relies on the fact that there are different circumstances under which a particular function must be represented in an existing encoding scheme. Functions may be partitioned into three categories:

1) Functions that are supported by some, but not all slave devices in the network.
2) Functions that are supported by each and every one of the slave devices in the network.
3) Functions that are supported by none of the slave devices in the network.

It is only necessary for functions in the first category, that is, those which are supported by some, but not all slave devices, to be defined in the network. This is because, in this case, it is necessary for the master device 101 to be able to distinguish between the capabilities of the different slave devices 103, 103', 103". For the last two categories, however, no network definition is necessary because the master device 101 can be designed to include default values which are equally applicable to all slave devices 103, 103', 103". Thus, if it is known that all slave devices support a given function, the master device 101 does not need to investigate whether any particular slave device 103 supports that function. Instead, the master device simply uses that function in its communications with all slave nodes 103, 103', 103". Similarly, if it is known that none of the slave devices support a particular function, the master device 101 is designed so that it never attempts any communications which rely on this particular function being supported by a slave device 103. The master device 101 is preferably controlled by software, so that it can be easily upgraded as the capabilities of the network change over time.

Figure 2A:
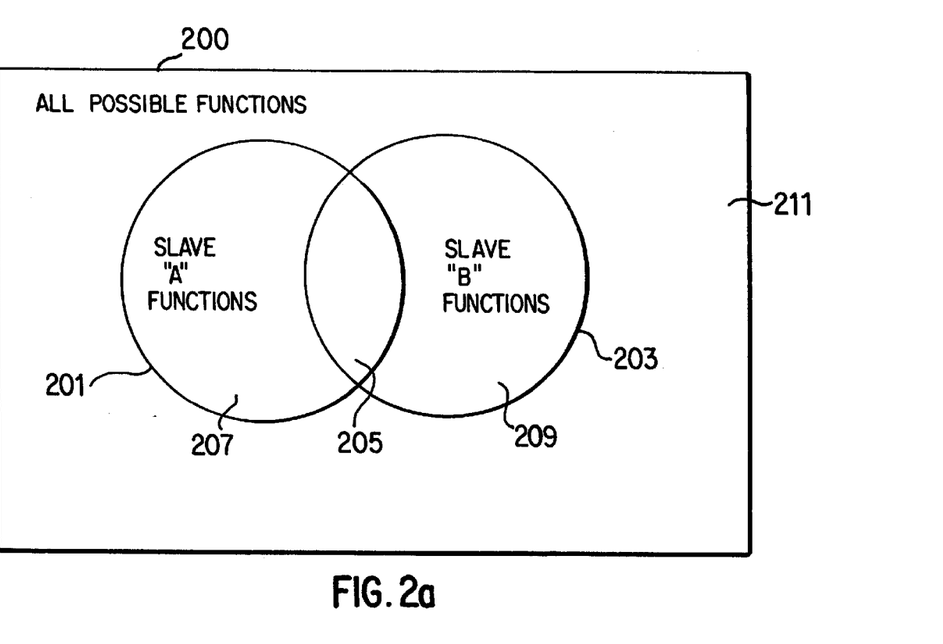
FIGS. 2a and 2b are diagrams illustrating how categories of functions change when a new slave device is added to a system previously having only two slave devices.

The above may be further understood with reference to FIG. 2a, which is a diagram that illustrates categories of functions which need to be included in an encoding scheme for capability information 109 when a system contains only two slave devices, referred to here as "A" and "B". The interior of the box 200 represents all possible functions that could ever be defined for a network. The first circle 201 encompasses all functions supported by slave device "A". The second circle 203 encompasses all functions supported by slave device "B". It can be seen that there is a common area 205 which defines a set of functions which are common to slave devices "A" and "B" (and therefore to all slave devices in the network, since in this example, there are only two slave devices). The diagram also shows that there is a first set of exclusive functions 207 which are supported by slave "A" but not by slave "B", and also that there is a second set of exclusive functions 209 which are supported by slave "B" but not by slave "A". The empty area 211, which lies entirely outside of both the first and second circles 201, 203 represents functions which are not supported by any slave device in the network.

In this example, only the first and second sets of exclusive functions 207, 209 need to be defined in an encoding scheme for capability information 109, because the master device 101 needs to know whether or not the slave device with which it intends to communicate supports the function. By contrast, the master device can freely use any of the functions located in the common area 205 without investigating whether it is supported, because, by definition, it is supported by each and every node in the network. As to the functions lying in the empty area 211, these are not supported by either of the slave devices "A" and "B", so the design of the master device 101 does not have to include any definition for these functions; such definition would lead to inefficiencies, because the master device would never find a slave device that supported any of these functions.

Figure 2B:
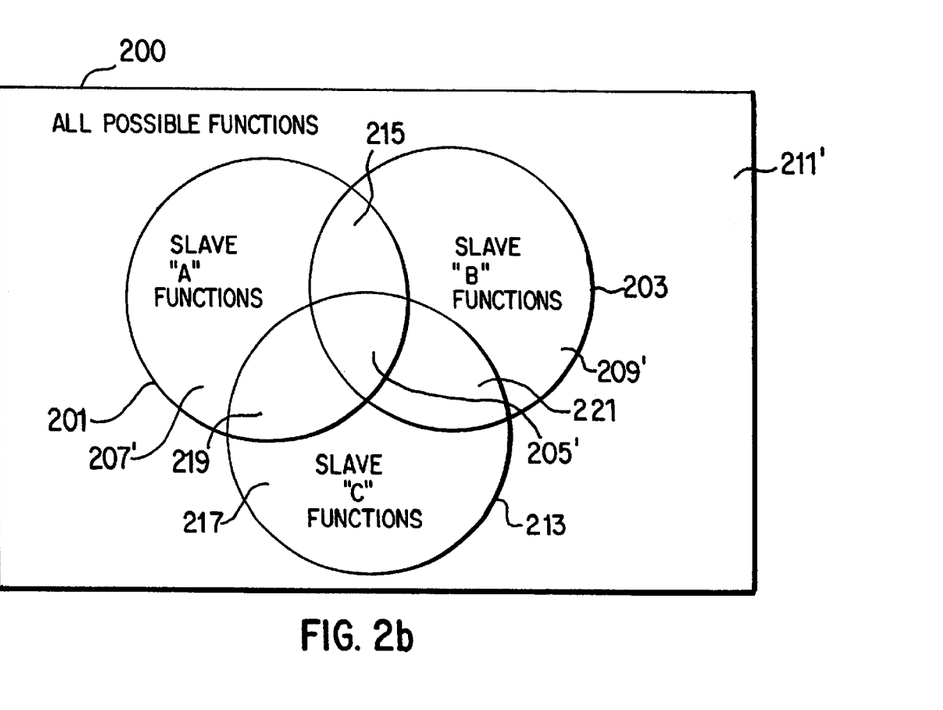

If a new slave device "C" were to be added to the network, the encoding scheme for the capability information 109 would have to be changed as shown in FIG. 2b. The first and second circles 201, 203 still represent the functions supported by slaves "A" and "B". The third circle 213 encompasses all of the functions supported by the new slave device "C". In this example, the common area 205' has been reduced, because slave "C" does not support each of the functions supported by slave devices "A" and "B". As a result, the functions located in the first new area 215, which formerly were in the common area 205 and needed no definition within the network, now need to be defined in the encoding scheme so that the master device 101 can distinguish between slave device "C", which does not support these functions, and slave devices "A" and "B" which do. The old default will no longer work for these functions.

Similarly, in this example, the slave device "C" supports functions, located in the second new area 217, which previously were not supported by any slave device in the network. Consequently, these functions will also have to be added to the encoding scheme, so that the master device 101 can distinguish between the slave device "C" which supports these functions, and the slave devices "A" and "B" which do not. The old encoding scheme, whereby the functions located in the second new area 217 defaulted to an unsupported status within the master device 101 because they were previously part of the empty area 211, will no longer work. In FIG. 2b, the empty area 211' now represents all possible functions which are not supported by any of the slave devices "A", "B" or "C".

To summarize the above discussion, an existing network need only represent functions which are supported only by a subset of all slave devices. Any function that is supported by all of the slave devices need not be represented in the capability information 109, because the master device 101 can be designed to use that particular function with any slave device it communicates with. Similarly, any function that is supported by none of the slave devices need not be represented in the capability information 109, because the master device 101 can be designed to never use that particular function with any slave device in the network that it communicates with. When a new slave device is added to the network, the encoding scheme must be modified to add those functions which formerly were supported either by all or none of the previously existing slave devices.

Figure 3:
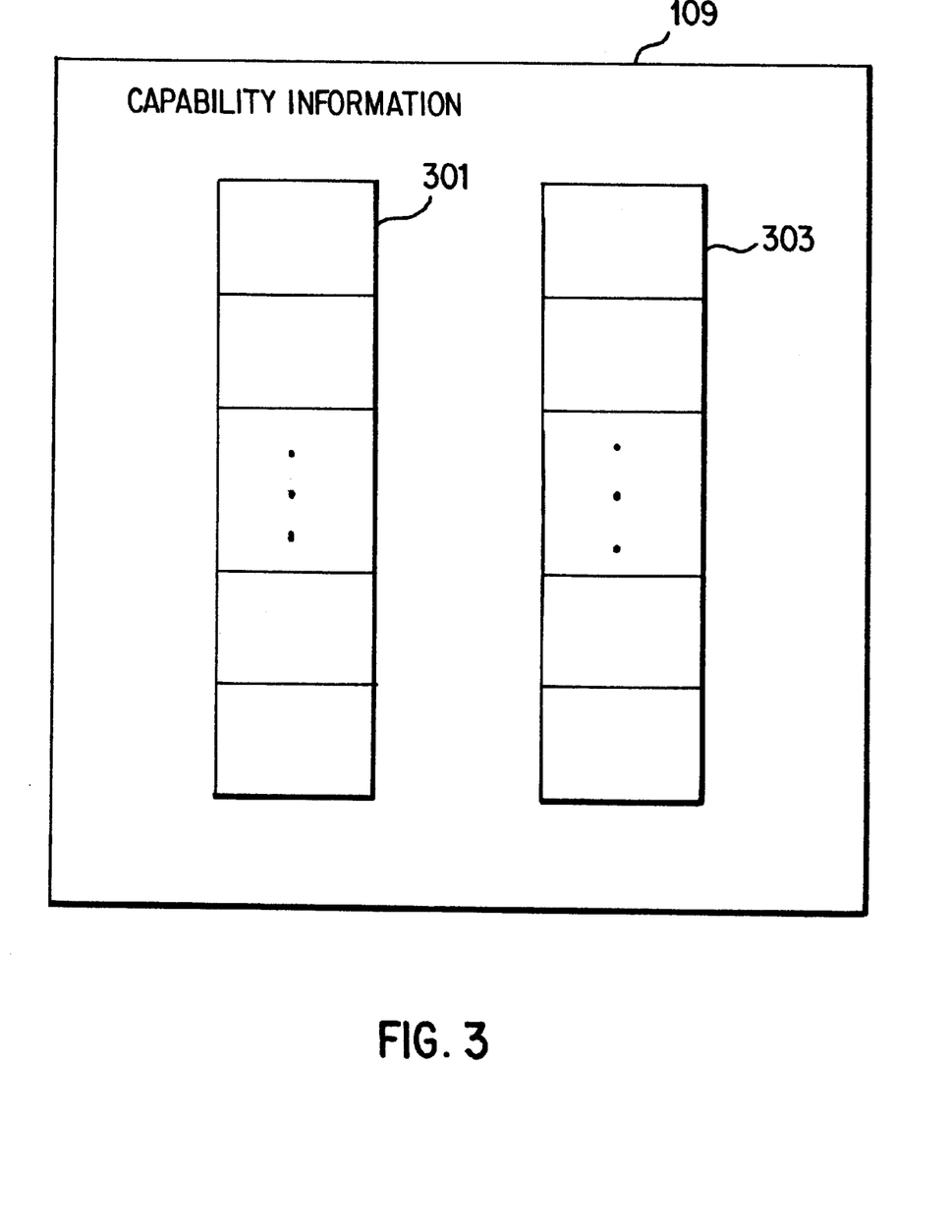
FIG. 3 illustrates a preferred embodiment of an encoding scheme for the capability information.

Referring now to FIG. 3, a preferred embodiment of an encoding scheme for the capability information 109 is shown. The following discussion makes use of terms such as "variable" and "boolean value" as an aid to understanding the invention. However, it should be understood that these terms actually refer to physical entities, such as electrical signals, which are generated in the network, and which cause other operations to take place.

In accordance with the present invention, this encoding scheme allows new functions (i.e., those which formerly did not need to be defined in the system because they were either always supported or never supported) to be added without having to re-encode the capability information 109 of slave devices 103, 103', 103" which were already part of the system.

The capability information 109 is encoded as two vectors, each containing a list of variables which correspond to a list of functions which have been defined in the network. The variables are preferably boolean variables which may either be set equal to TRUE or FALSE in correspondence with whether or not an associated function is supported by the slave device 103.

Each function that is defined in the network is represented by a variable in only one of the two lists. When a network is defined for the first time, it does not matter whether a corresponding variable for a function is located in the first vector 301 or in the second vector 303. However, the location of the variable is important for every new slave device 103 that gets added to the network. This significance will be explained by way of example.

Figure 4A:
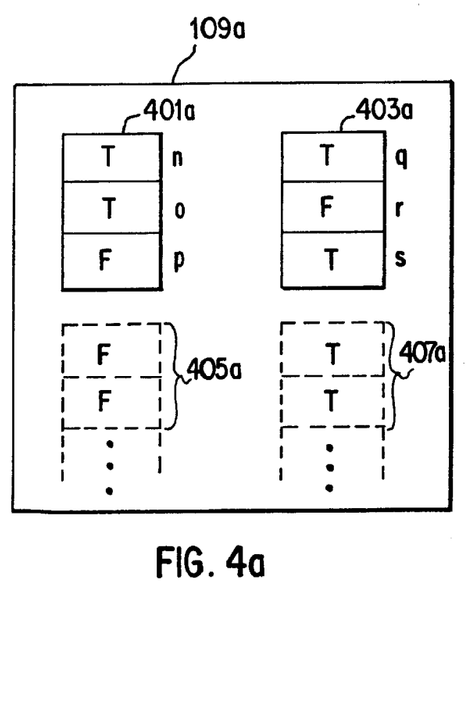
FIGS. 4a–4c illustrate the techniques of providing default values for pre-existing capability information, and of adding new functions to the encoding scheme in accordance with the present invention.
Figure 4B:
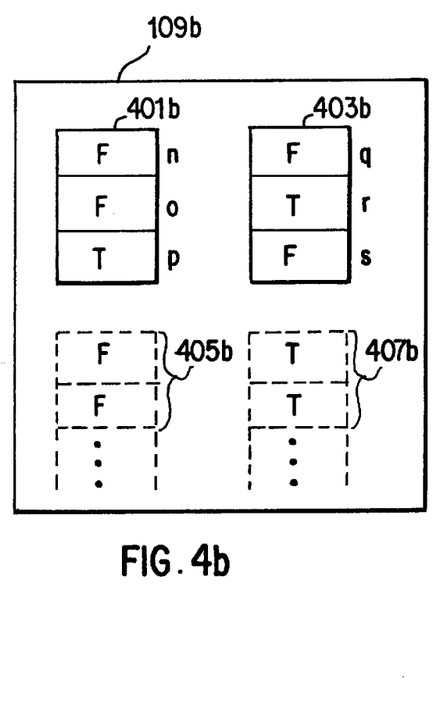

FIG. 4a depicts the capability information 109 for a slave device "A" in a network having only the two slave devices "A" and "B", which were both present when the network was first created. Similarly, FIG. 4b depicts the capability information 109 for slave device "B" in this same network. With respect to slave device "A", the first vector 401a has been set, for the purposes of illustration, to show that slave device "A" supports functions n and o, but does not support function p. Also, the second vector 403a has been set to indicate that the slave device "A" supports functions q, and s, but does not support function r. Similarly, with respect to slave device "B", the first vector 401b has been set to indicate that the slave device "B" supports function p, but does not support function n or function o. Also, the second vector 403b has been set to indicate that the slave device "B" supports function r but does not support function q or function s. It will be observed that, in this example, none of the functions are either supported or not supported by both slave devices "A" and "B". This is because, as explained above with reference to FIGS. 2a and 2b, there is no point in defining functions which lie in either the common area 205 or the empty area 211. Instead, the master device 101 can be designed to include defaults which are appropriate for this particular system. However, there is no reason why any particular group of such functions could not be included within the capability information 109, and either both set to TRUE (function supported) or both set to FALSE (function not supported) boolean values. A complete specification of all of such functions, though, could be impossible to generate, since an endless number of functions can be defined.

Figure 4C:
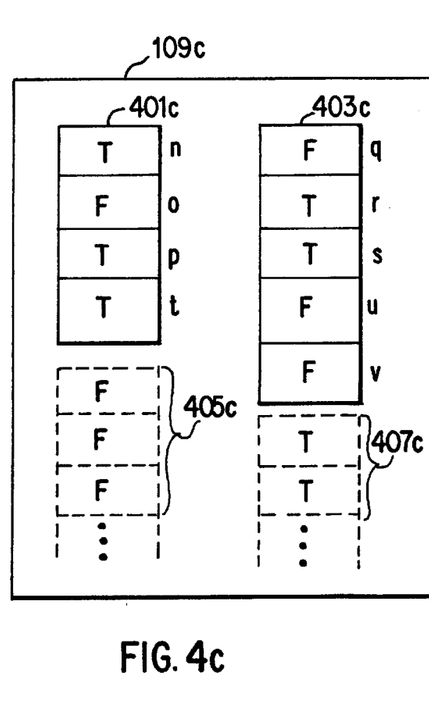

FIG. 4c shows the capability information 109 of a slave device "C" which is now added to the system. It too contains a first vector 401c and a second vector 403c. The addition of slave device "C" to the network has the effect previously illustrated in FIG. 2b. That is, slave device "C" supports some of the functions which are also commonly supported by slave devices "A" and "B" (see common area 205'). Consequently, there is still no reason for these functions to be defined within the capability information: the master device 101 continues to know that these functions are supported by each slave device in the network. Also, slave device "C" does not support many of the functions which are also not supported by either of slave devices "A" and "B" (see empty area 211'). Again, there is no reason for these functions to be defined within the capability information: the master device 101 continues to know that these functions are not supported by any slave device in the network.

Referring to FIG. 2b, it can be seen that there is a first partly common area 219, which includes only those functions which are supported by slave devices "A" and "C", but not by slave device "B". These functions were previously defined in the network and, in our example, are functions n and s. Consequently in vector 401c, the variable corresponding to function n is set equal to TRUE, and in vector 403c, the variable corresponding to function s is set equal to TRUE.

Also, referring to FIG. 2b, it can be seen that there is a second partly common area 221, which includes only those functions which are supported by slave devices "B" and "C", but not by slave device "A". These functions were previously defined in the network and in our example, are functions p and r. Consequently in vector 401c, the variable corresponding to function p is set equal to TRUE, and in vector 403c, the variable corresponding to function r is set equal to TRUE.

The first and second sets of exclusive functions 207' and 209' are defined, but not supported by slave device "C". The variables corresponding to these functions o and q are set equal to FALSE in the first and second vectors 401c, 403c.

Referring again to FIG. 2b, it can be seen that there is a need to define new functions as a result of the introduction of slave device "C" into the pre-existing network. First, there are functions which formerly were in the common area 205, but which are now in the first new area 215 because these functions are not supported by slave device "C". For the sake of this example, these will be called functions u and v. In accordance with the present invention, new functions which are conceptually located in the first new area 215 must be added to the second vector 403c. The master device 101 is also modified to recognize a second vector having the format of second vector 403c. Thus, in FIG. 4c, the second vector 403c also includes variables corresponding to functions u and v. These two variables have been set equal to FALSE, in order to indicate that slave device "C" does not support these functions. Also in accordance with the present invention, it is not necessary to add variables to either of the second vectors 403a or 403b, which correspond to slave devices "A" and "B", because the master device 101 is designed to assume the presence of default values equal to TRUE whenever it recognizes that the second vector 403a, 403b is not as long as the longest second vector 403c in the network. The default values are represented by the dotted line values 407a, 407b in the second vectors 403a, 403b. It is not necessary for these dotted line values 407a, 407b to actually exist in the second vectors 403a, 403b, so long as the master device 101 is designed to recognize the actual end of the second vectors 403a, 403b, and to then provide the default values of TRUE whenever they are needed. Each of the first and second vectors 401a, 401b, 401c, 403a, 403b, 403c preferably includes a length indicator (not shown) for use by the master device 101 in determining the length of the vector. However, there is no reason why the second vectors 403a, 403b could not actually contain variables corresponding to undefined functions. In this case, the undefined variables in the second vectors 403a, 403b should actually be set equal to TRUE. It should be noted that the second vector 403c of slave device "C" also contains dotted line values 407c which function exactly as described above with respect to dotted line values 407a and 407b, and which are used when the network is expanded to include yet another new slave device that causes new functions to be defined.

Referring back to FIG. 2b, there is also a need to define those new functions which were formerly part of the empty area 211 (i.e., not supported by either of slave devices "A" or "B"), but which are now supported by slave device "C" (see the second new area 217). For the sake of this example, this will be called function t. In accordance with the present invention, new functions which are conceptually located in the second new area 217 must be added to the first vector 401c. The master device 101 is also modified to recognize a first vector having the format of first vector 401c. Thus, in FIG. 4c, the first vector 401c also includes a variable corresponding to function t. This variable has been set equal to TRUE, in order to indicate that slave device "C" does support this function. Also in accordance with the present invention, it is not necessary to add variables to either of the first vectors 401a or 401b, which correspond to slave devices "A" and "B", because the master device 101 is designed to assume the presence of default values equal to FALSE whenever it recognizes that the first vector 401a, 401b is not as long as the longest first vector 401c in the network. This is represented by the dotted line values 405a, 405b in the first vectors 401a, 401b. It is not necessary for these dotted line values 405a, 405b to actually exist in the first vectors 401a, 401b, so long as the master device 101 is designed to recognize the actual end of the first vectors 401a, 401b, and to then provide the default values of FALSE whenever they are needed. However, there is no reason why the first vectors 401a, 401b could not actually contain variables corresponding to undefined functions. In this case, the undefined variables in the first vectors 401a, 401b should actually be set equal to FALSE. It should be noted that the first vector 401c of slave device "C" also contains dotted line values 405c which function exactly as described above with respect to dotted line values 405a and 405b.

It is important, for the proper functioning of this system, that whenever the master device is given control software 107 which contains a new encoding scheme for the capability information 109, the master device 101 is also upgraded, preferably by means of new software, so that it will know the meanings of the newly defined variables. Without upgraded software, the master device 101 would assume that the new slave device supports every function previously supported by all the pre-existing slave devices (see common area 205), when this might not be the case. In order to avoid this type of error, the master device 101 may compare the actual length of the capability information 109 with an expected length. If a mismatch occurs, then system integrity is jeopardized, and an appropriate error routine should be invoked. Implementation of such an error routine is system dependent, and beyond the scope of this discussion.

In the embodiment of the invention, referred to previously, in which the capability information 109 is downloaded from the master device 101 to the slave device 103, another aspect of the present invention has the slave device examining the capability information 109, in order to determine what functions the master device 101 expects it supports, and to determine whether it actually has the hardware to support these functions. Alternatively, if the capability information 109 is not included with the software that is downloaded from the master device 101 to the slave device 103, then the control software 107 may, itself, include instructions to make sure that the expected hardware environment actually exists at the slave device 103. This determination may be necessary if there is a chance that the master device 101 has received an upgraded version of software 107 before the hardware in the slave device 103 has actually been upgraded. In the event of this occurrence, the slave device 103 should notify the master device 101 of the occurrence of an error condition.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a system having a master device coupled to a slave device by means of an interface, wherein a function of the master device includes downloading a control program to the slave device, an apparatus for providing the master device with capability information corresponding to the slave device, the apparatus means for reading the capability information from a redefined portion of the control program; and     means for storing the capability information for use by the master device during a communications operation with the slave device,     wherein the capability information comprises a first vector having a first number of first variables and a second vector having a second number of second variables, each of the first and second variables representing a corresponding function that alternatively may or may not be supported by the corresponding slave device, and     wherein the means for reading comprises:

first default means, responsive to the first number of variables being less than a number of defined first vector variables, for supplying first default values for first variables that are missing in the first vector, the first default values indicating that corresponding functions are not supported by the corresponding slave device; and         second default means, responsive to the second number of second variables being less than a number of defined second vector variables, for supplying second default values for second variables that are missing in the second vector, the second default values indicating that corresponding functions are supported by the corresponding slave device.

2. The apparatus of claim 1 wherein the first and second number of variables may each alternatively be zero or at least one.

3. A system comprising:

a slave device:

an interface having first and second ends, the first end being coupled to the slave device;

a master device, coupled to the second end of the interface, and including means for reading capability information from a redefined portion of a control program intended for downloading to the slave device, wherein the capability information comprises a first vector having a first number of first variables and a second vector having a second number of second variables, each of the first and second variables representing a corresponding function that alternatively may or may not be supported by the corresponding slave device, and wherein the means for reading comprises:

first default means, responsive to the first number of variables being less than a number of defined first vector variables, for supplying first default values for first variables that are missing in the first vector, the first default values indicating that corresponding functions are not supported by the corresponding slave device; and     second default means, responsive to the second number of second variables being less than a number of defined second vector variables, for supplying second default values for second variables that are missing in the second vector, the second default values indicating that corresponding functions are supported by the corresponding slave device.

4. The apparatus of claim 3 wherein the first and second number of variables may each alternatively be zero or at least one.

5. In a system having a master device coupled to a slave device by means of an interface, wherein a function of the master device includes downloading a control program to the slave device, a method for providing the master device with capability information corresponding to the slave device, the method comprising the steps of:

inseparably associating the capability information with the control program:

providing the master device with the control program and the associated capability information; and     reading, in the master device, the associated capability information, wherein:

the capability information comprises a first vector having a first number of first variables, and a second vector having a second number of second variables, each of the first and second variables representing a corresponding function that alternatively may or may not be supported by the corresponding slave device, and     the step of reading comprises the steps of:

in response to the first number of first variables being less than a number of defined first vector variables, supplying first default values for first variables that are missing in the first vector, the first default values indicating that corresponding functions are not supported by the corresponding slave device; and         in response to the second number of second variables being less than a number of defined second vector variables, supplying second default values for second variables that are missing in the second vector, the second default values indicating that corresponding functions are supported by the corresponding slave device.

6. In a system having a master device coupled to a plurality of slave devices, each slave device having corresponding capability information stored in the master device, a method for adding a new slave device to the system, comprising the steps of:

storing in the master device a new first vector having a length equal to a predefined first vector, each variable in the new first vector being set in correspondence with the new slave device alternatively supporting or not supporting a corresponding function defined in the predefined first vector;

storing in the master device a new second vector having a length equal to a predefined second vector, each variable in the new second vector being set in correspondence with the new slave device alternatively supporting or not supporting a corresponding function defined in the predefined second vector;

allocating in the master device an additional storage location to be associated with the new first vector and storing therein a first additional variable in correspondence with a first new function that is supported by the new slave device but not supported by any pre-existing slave device, the first additional variable being set to indicate that the slave device supports the first new function;

allocating in the master device an additional storage location to be associated with the new second vector and storing therein a second additional variable in correspondence with a second new function that is supported by every pre-existing slave device but not supported by the new slave device, the second additional variable being set to indicate that the slave device does not support the second new function;

redefining the first predefined vector to include a storage location corresponding to the first additional variable; and redefining the second predefined vector to include a storage location corresponding to the second additional variable.

7. In a system having a master device coupled to a slave device by means of an interface, an apparatus for determining a set of functions that are supported by the slave device, comprising:

input means for receiving a first vector having a first number of first variables, and a second vector having a second number of second variables, each of the first and second variables representing a corresponding function that alternatively may or may not be supported by the corresponding slave device;

first default means, coupled to the input means and responsive to the first number of first variables being less than a number of defined first vector variables, for supplying first default values for first variables that are missing in the first vector, the first default values indicating that corresponding functions are not supported by the corresponding slave device; and second default means, coupled to the input means and responsive to the second number of second variables being less than a number of defined second vector variables, for supplying second default values for second variables that are missing in the second vector, the second default values indicating that corresponding functions are supported by the corresponding slave device.

* * * * *